(12) United States Patent
Ding et al.

(10) Patent No.: US 12,539,892 B2
(45) Date of Patent: Feb. 3, 2026

(54) ASSEMBLY-TYPE CAR BODY AND RAIL VEHICLE (71) Applicant: CRRC QINGDAO SIFANG CO., LTD., Shandong (CN)

(72) Inventors: Sansan Ding, Shandong (CN); Peipei Wu, Shandong (CN); Aiqin Tian, Shandong (CN); Haiting Liang, Shandong (CN); Hongwei Zhao, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 743 days.

(21) Appl. No.: 17/787,474

(22) PCT Filed: May 18, 2020

(86) PCT No.: PCT/CN2020/090778
§ 371 (c)(1),
(2) Date: Jun. 20, 2022

(87) PCT Pub. No.: WO2021/135041
PCT Pub. Date: Jul. 8, 2021

(65) Prior Publication Data
US 2023/0083245 A1  Mar. 16, 2023

(30) Foreign Application Priority Data

Jan. 2, 2020  (CN) .......................... 202010003050.0
Jan. 2, 2020  (CN) .......................... 202020002975.9

(51) Int. Cl.
*B61D 17/00* (2006.01)
*B61D 17/08* (2006.01)
(Continued)

(52) U.S. Cl.
CPC ............. *B61D 17/00* (2013.01); *B61D 17/08* (2013.01); *B61D 17/10* (2013.01); *B61D 17/12* (2013.01);
(Continued)

(58) Field of Classification Search
CPC ........ Y02T 30/00; B61D 17/12; B61D 17/08; B61D 17/00; B61D 17/10; B61D 25/00; B61D 19/00; B61D 27/0018
See application file for complete search history.

(56) References Cited

U.S. PATENT DOCUMENTS 3,950,915 A  4/1976  Cole
5,042,395 A * 8/1991  Wackerle ............... B61D 17/00
                                                        296/193.04
(Continued)

FOREIGN PATENT DOCUMENTS

CN  201484421 U  *  5/2010
CN  103241252 A     8/2013
(Continued)

OTHER PUBLICATIONS

European search report issued on Jan. 2, 2024 for EP20910692.1.
(Continued)

*Primary Examiner* — Cheng Lin
(74) *Attorney, Agent, or Firm* — Yue (Robert) Xu; Apex Attorneys at Law, LLP (57) ABSTRACT An assembly-type car body and a rail vehicle. A roof, an underframe, side roofs and side walls of the assembly-type car body are separately formed by assembling double-layer pultruded profiles, and each double-layer pultruded profile comprises an outer plate, an inner plate and cavities formed by separating an interlayer between the outer plate and the inner plate using ribs; the upper edge and the lower edge of each side roof are respectively connected to an edge of the
(Continued)

roof and the upper edge of a side wall by means of lapping joints, and the lower edge of each side wall is connected to an edge of the underframe by means of a side wall connector; each side wall connector is a double-layer pultruded profile unit, the upper edge of the side wall connector is connected to the lower edge of the side wall by a plug joint.

27 Claims, 6 Drawing Sheets

(51) Int. Cl.
 *B61D 17/10* (2006.01)
 *B61D 17/12* (2006.01)
 *B61D 19/00* (2006.01)
 *B61D 25/00* (2006.01)
 *B61D 27/00* (2006.01)
(52) U.S. Cl.
 CPC ............. *B61D 19/00* (2013.01); *B61D 25/00* (2013.01); *B61D 27/0018* (2013.01); *Y02T 30/00* (2013.01)

(56) References Cited

U.S. PATENT DOCUMENTS

| | | | | |
|---|---|---|---|---|
| 7,478,600 | B2 * | 1/2009 | Beers | B61D 17/005 105/423 |
| 2003/0196567 | A1 * | 10/2003 | Norton | B61D 17/045 105/396 |
| 2019/0389494 | A1 * | 12/2019 | Ding | B61D 17/045 |
| 2020/0290653 | A1 * | 9/2020 | Fukata | B61D 25/00 |

FOREIGN PATENT DOCUMENTS

| | | | | |
|---|---|---|---|---|
| CN | 105197031 | A | | 12/2015 |
| CN | 107010081 | A * | 8/2017 | ......... B61D 27/0018 |
| CN | 107237518 | A | | 10/2017 |
| CN | 207758783 | U * | 8/2018 | |
| CN | 108657212 | A * | 10/2018 | ........... B61D 17/041 |
| CN | 208216713 | U | | 12/2018 |
| CN | 109835359 | A | | 6/2019 |
| CN | 109866789 | A | | 6/2019 |
| CN | 111152805 | A | | 5/2020 |
| CN | 211519498 | U | | 9/2020 |
| DE | 102007035772 | A1 | | 2/2009 |
| DE | 102014224407 | A1 | | 6/2016 |
| DE | 102017102563 | A1 | | 8/2018 |
| EP | 3929054 | A1 | | 12/2021 |
| JP | 2001193175 | A | | 7/2001 |
| JP | 2004130872 | A * | 4/2004 | |
| JP | 2011131637 | A | | 7/2011 |
| JP | 2012017043 | A | | 1/2012 |
| JP | 2012171496 | A | | 9/2012 |
| JP | 2016049939 | A * | 4/2016 | |
| JP | 2019059320 | A | | 4/2019 |

OTHER PUBLICATIONS

The 1st Office Action dated Aug. 30, 2024 for the Chinese Patent Application No. CN202010003050.0.
International Search Report for PCT/CN2020/090778 mailed Sep. 22, 2020, ISA/CN.

* cited by examiner

ASSEMBLY-TYPE CAR BODY AND RAIL VEHICLE

This disclosure is a national phase application of PCT international patent application PCT/CN2020/090778, filed on May 18, 2020 which claims the benefit of priorities to the following two Chinese patent applications, both of which are incorporated herein by reference in their entireties, 1) Chinese Patent Application No. 202010003050.0, titled "ASSEMBLY-TYPE CAR BODY AND RAIL VEHICLE", filed with the China National Intellectual Property Administration on Jan. 2, 2020; and
2) Chinese Patent Application No. 202020002975.9, titled "ASSEMBLY-TYPE CAR BODY AND RAIL VEHICLE", filed with the China National Intellectual Property Administration on Jan. 2, 2020.

FIELD

The present disclosure relates to the technical field of rail vehicles, and in particular to a splicing-type vehicle body of a rail vehicle. The present disclosure further relates to a rail vehicle with the splicing-type vehicle body.

BACKGROUND

With the increasing speed of a rail vehicle, higher requirements have been put forward for the structural strength, stiffness and lightweight design of a vehicle body of the rail vehicle.

A metal vehicle body of the existing rail vehicle is generally assembled by welding metal materials such as carbon steel, stainless steel, and aluminum alloy, which has disadvantages of large self-weight, low strength and easy corrosion compared with a composite material vehicle body. The composite material vehicle body mainly has a plate-beam assembly structure or a single-layer profile splicing structure. The product has large number of structural sections, the assembly workload is large, the sections are connected by rivets or bonded rivets, there are many connecting holes with large processing capacity of rivet holes and easy rain leakage; a large number of metal connectors are used in the structures of the vehicle body, which has poor weight reduction effect and low production efficiency; panels of the vehicle body are mainly in sandwich structures, a core material is prone to quality defects during molding, and the sound insulation effect is poor.

It can be seen that the vehicle body of the rail vehicle has disadvantages of complex structure, large overall weight, low production efficiency, etc., which cannot meet the higher technical requirements of the vehicle for lightweight and corrosion resistance, and needs to be further improved.

SUMMARY

An object according to the present disclosure is to provide a splicing-type vehicle body. Under the same strength condition, the vehicle body has advantages of high stiffness, light self-weight and high production efficiency, which can meet the load requirements of complex working conditions such as air tightness load and torsional load of the vehicle body of the rail vehicle.

Another object is to provide a rail vehicle with the splicing-type vehicle body.

In order to achieve the above object, a splicing-type vehicle body is provided according to the present disclosure, which includes a roof, a underframe, side roofs and side walls located on two sides; an upper edge of each side roof is connected to an edge of the roof, an upper edge of each side wall is connected to a lower edge of the side roof, a lower edge of each side wall is connected to an edge of the underframe; the roof, the underframe, the side roofs and the side walls are respectively formed by splicing double-layer pultruded profiles with different shapes, each double-layer pultruded profile includes an outer plate, an inner plate and chambers in an interlayer between the outer plate and the inner plate and separated by rib plates; the upper edge and the lower edge of each side roof are respectively connected to the edge of the roof and the upper edge of the side wall through lapping joints, the lower edge of each side wall is connected to the edge of the underframe through a side wall connector; the side wall connector is a single double-layer pultruded profile, an upper edge of the side wall connector is connected to the lower edge of the side wall through a plug joint, and a lower edge of the side wall connector is connected to the edge of the underframe through a push-on joint.

Preferably, each lapping joint comprises a first lapping end and a second lapping end respectively formed on edges of two connected double-layer pultruded profiles, an outer side of the first lapping end is provided with a first lapping edge extending from the outer plate, an inner side of the second lapping end is provided with a second lapping edge extending from the inner plate, a step matched with the first lapping edge is formed on an outer side of the second lapping end, and a step matched with the second lapping edge is formed on an inner side of the first lapping end.

Preferably, a slot or a recess is formed on an end surface and an inner side surface of the first lapping end and an inner surface of the first lapping edge, respectively; or a slot or a recess is formed on an end surface and an inner side surface of the second lapping end and an inner surface of the second lapping edge, respectively.

Preferably, each plug joint includes a male plug and a female plug respectively formed on edges of two connected double-layer pultruded profiles, the female plug has a socket outer edge and a socket inner edge respectively extending from the outer plate and the inner plate, a step configure to be matched with the socket outer edge is formed on the outer plate of the male plug, and a step configure to be matched with the socket inner edge is formed on the inner plate of the male plug.

Preferably, a slot or a recess is formed on an end surface, the outer plate and an outer surface of the inner plate of the male plug; or, a slot or a recess is formed on an end surface, the outer plate and an inner surface of the inner plate of the female plug.

Preferably, each push-on joint includes a push-on slot formed on an upper surface of the edge of the underframe and a push-on connector formed on the lower edge of the side wall connector; the push-on slot includes a first push-on plate and a second push-on plate, the first push-on plate is located on an outer side, the second push-on plate is located on an inner side, a distance between the first push-on plate and the second push-on plate gradually increases from top to bottom, and a trapezoidal push-on slot is formed between the first push-on plate and the second push-on plate; the push-on connector of the side wall connector has a trapezoidal cross section so as to be pushed into the push-on slot from an end.

Preferably, a slot or a recess is formed in an inner surface of the push-on slot or an outer surface of the push-on connector.

Preferably, the upper edge and the lower edge of each side roof are respectively connected to the edge of the roof and the upper edge of the side wall through the lapping joints in opposite lapping directions.

Preferably, a distance between the outer plate and the inner plate of the double-layer pultruded profile of each side roof in a cross section gradually increases and then decreases from the upper edge to the lower edge; the distance between the outer plate and the inner plate of the double-layer pultruded profile of each side wall in a cross section gradually decreases and then increases from the upper edge to the lower edge.

Preferably, the splicing-type vehicle body further includes an air duct profile connected below the roof, and the air duct profile is configured to form a sealed roof ventilation air duct.

Preferably, an axial passage with an upward opening is defined inside the roof ventilation air duct, and the axial passage and a lower surface of the double-layer pultruded profile of the roof form the roof ventilation air duct.

Preferably, the axial passage includes a main passage located at the center and sub passages located on two sides of the main passage.

Preferably, the sub passages includes a first sub passage located outside the main passage and a second sub passage located outside the first sub passage; the main passage is substantially rectangular, the first sub passage is substantially trapezoidal, and the second sub passage is substantially triangular.

Preferably, the axial passage of the air duct profile is formed by providing a vertical partition plate, a connecting portion in a bending shape is respectively provided on an upper edge of the partition plate and upper edges of two sides of the air duct profile, and the connecting portions abut against a lower surface of the roof and are bonded riveted with the lower surface of the roof.

Preferably, the air duct profile includes a left profile and a right profile which are symmetrical and a connecting plate in the middle, the connecting plate forms a bottom of the main passage, and a left edge and a right edge of the connecting plate are respectively stacked and connected to extension edges at bottoms of the left profile and the right profile.

Preferably, the double-layer pultruded profile of the roof includes a first roof profile in the middle and a second roof profile and a third roof profile which are symmetrical, and the first roof profile is respectively connected to the second roof profile and the third roof profile through plug joints.

Preferably, the double-layer pultruded profile of each side roof includes a first side roof profile and a second side roof profile, and the first side roof profile and the second side roof profile are connected through a plug joint.

Preferably, a position of the lapping joint on the upper edge of the side roof is the same with a position of a roof conditioner mounting seat, the lapping joint of the side roof has the same structure with that of a roof equipment mounting seat interface; a position of the lapping joint on the lower edge of the side roof is the same with a position of an upper edge of a window opening.

Preferably, the side roof is provided with a mounting rib plate for assembling a vehicle door on an upper edge of the vehicle door.

Preferably, the double-layer pultruded profile of each side wall includes a first side wall profile, a second side wall profile, a third side wall profile and a fourth side wall profile, the first side wall profile is connected to the second side wall profile through a plug joint, the second side wall profile is connected to the third side wall profile through a lapping joint, and the third side wall profile is connected to the fourth side wall profile through a plug joint.

Preferably, the lapping joint between the second side wall profile and the third side wall profile is at the same level with a lower edge of a vehicle window, the first side wall profile and the second side wall profile are cut at the vehicle window, a cutting size of is the same with a length of the vehicle window, to form a window opening.

Preferably, the double-layer pultruded profile of the underframe includes a first underframe profile in the middle, a second underframe profile, a third underframe profile, a fourth underframe profile, a fifth underframe profile, a sixth underframe profile and a seventh underframe, the second underframe profile, the third underframe profile and the fourth underframe profile are symmetrical with the fifth underframe profile, the sixth underframe profile and the seventh underframe profile on two sides of the first underframe profile, and the first underframe profile, the second underframe profile, the third underframe profile, the fourth underframe profile, the fifth underframe profile, the sixth underframe profile and the seventh underframe profile are connected through six plug joints.

Preferably, a height of the first underframe profile is higher than the second underframe profile and the fifth underframe profile on the two sides of the first underframe profile, and a bending portion extending obliquely upward to be transitionally connected to the first underframe profile is respectively provided on the second underframe profile and the fifth underframe profile.

Preferably, a platform step is formed at a connection between each side wall and the underframe by removing a flange of a socket to mount a vehicle door mechanism.

Preferably, the chambers of each double-layer pultruded profile include a triangular chamber, a trapezoidal chamber, a rectangular chamber and a combination of the triangular chamber, the trapezoidal chamber and the rectangular chamber.

Preferably, the chambers of each double-layer pultruded profile of the roof, the underframe, the side roofs or the side walls are filled with thermal insulation material, vibration insulation material or noise reduction material.

Preferably, each double-layer pultruded profile is made of a carbon fiber composite material, and adjacent double-layer pultruded profiles are connected at a joint through adhesive; or, each double-layer pultruded profile is made of an aluminum alloy material, and adjacent double-layer pultruded profiles are connected at a joint by welding.

In order to achieve the above object, a rail vehicle is provided according to the present disclosure, which includes a vehicle body, a vehicle window, a vehicle door and a roof air conditioner which are arranged on the vehicle body, and the vehicle body is the splicing-type vehicle body according to any one of the above.

The vehicle body provided according to the present disclosure is composed of the roof, the underframe, the side roofs and the side walls on the two sides, and the side wall connectors, which are splicing assembled by means of lapping, plugging and pushing-on through the lapping joints, the plug joints and the push-on joints so as to form a barrel-shaped vehicle body structure, and each composite part is the double-layer pultruded profile, the multi-chamber profile has the characteristics of high strength, high stiffness and small weight of the multi-chamber profiles, so that the vehicle body structure has the characteristics of large stiffness, small self-weight and high production efficiency under the same strength condition, which can meet the load requirements of complex working conditions such as air tightness load and torsional load of the vehicle body of the rail vehicle, and well solves the problems of large self-weight, low strength and easy corrosion of the metal vehicle body of the existing rail vehicle can be solve. Meanwhile, the problems of large number of sections, poor effects of sealing and weight reduction, and low production efficiency of the existing composite material vehicle body can be solved. Furthermore, the assembly method can be flexibly adjusted according to the actual production resources of the product.

Reference numerals are as follows:

| | |
|---|---|
| 1 roof; | 1-1 first roof profile; |
| 1-2 second roof profile; | 1-3 third roof profile; |
| 1-4 male plug; | 1-5 female plug; |
| 1-6 slot; | 2 underframe; |
| 2-1 first underframe profile; | 2-2 second underframe profile; |
| 2-3 third underframe profile; | 2-4 fourth underframe profile; |
| 2-5 fifth underframe profile; | 2-6 sixth underframe profile; |
| 2-7 seventh underframe profile; | 2-8 first push-on plate; |
| 2-9 second push-on plate; | 2-10 platform step; |
| 3 side roof; | 3-1 first side roof profile; |
| 3-2 second side roof profile; | 3-3 first lapping end; |
| 4 side wall; | 4-1 first side wall profile; |
| 4-2 second side wall profile; | 4-3 third side wall profile; |
| 4-4 fourth side wall profile; | 4-5 second lapping end; |
| 5 side wall connector; | 5-1 push-on connector; |
| 6 air duct profile; | 6-1 connecting plate; |
| 6-2 left profile; | 6-3 right profile; |
| 6-4 partition plate; | 6-5 connecting portion; |
| 6-6 bearing portion; | 7 roof ventilation air duct; |
| 8 vehicle door mounting rib plate; | 9 air conditioner mounting seat interface; |
| 10 vehicle window mounting rib plate; | 11 vehicle body. |

DETAILED DESCRIPTION OF THE EMBODIMENTS

In order to enable those skilled in the art to better understand the technical solutions of the present application, the present application will be further described in detail with reference to the drawings and specific embodiments.

Herein, terms such as "up, down, left, right" are established based on the positional relationship shown in the accompanying drawings, and the corresponding positional relationship may also change according to the different accompanying drawings. Therefore, it should not be construed as an absolute limitation on the scope of the protection. In addition, relational terms such as "first" and "second" are only used to distinguish one element from another with the same name, and do not necessarily require or imply any such actual relationship or order between these elements.

Figure 1:
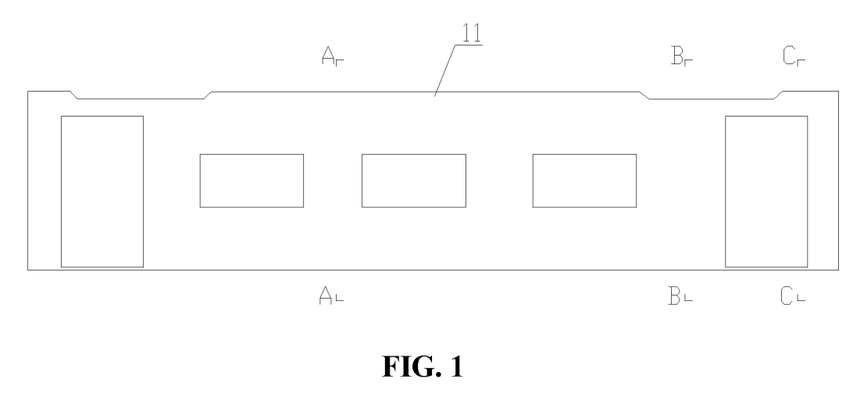
FIG. 1 is a side view of a splicing-type vehicle body according to an embodiment of the present disclosure.
Figure 2:
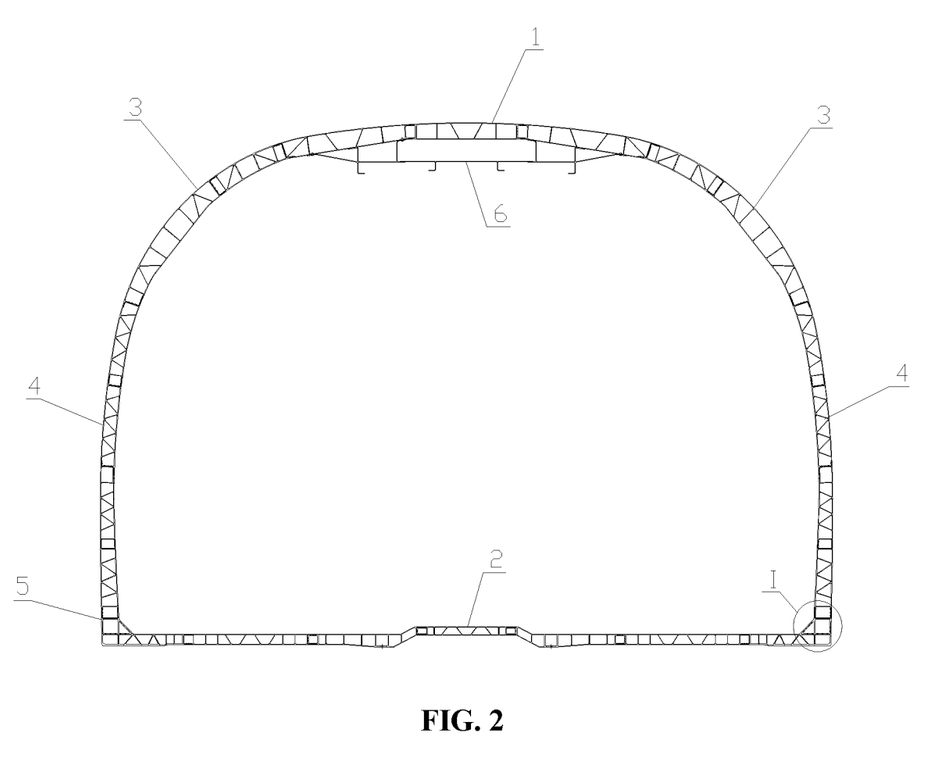
FIG. 2 is a cross sectional view of the splicing-type vehicle body shown in FIG. 1 taken along A-A.

Referring to FIG. 1 and FIG. 2, FIG. 1 is a side view of a splicing-type vehicle body according to an embodiment of the present disclosure; and FIG. 2 is a cross sectional view of the splicing-type vehicle body shown in FIG. 1 taken along A-A.

A carbon fiber composite material has excellent comprehensive properties of lightweight, high strength and high weather resistance, which becomes the preferred material to solve the problems of lightweight of a rail vehicle.

As shown in the figures, in a specific embodiment, a splicing-type vehicle body 11 provided according to the present disclosure is assembled mainly in splicing type by double-layer pultruded profiles made of carbon fiber composite material, the adjacent double-layer pultruded profiles are connected at a joint through adhesive to realize seamless connection of each module. The double-layer pultruded profiles are produced by pultrusion technology, and a main cross section of the vehicle body includes composite material double-layer pultruded profiles, sixteen plug joints, six lapping joints and two push-on joints which are bond to those profiles through self-expanding adhesive so that a main structure of a barrel-shaped composite material vehicle body is assembled. The vehicle with the structure has excellent strength, stiffness and air tightness, which can meet the load requirements of complex working conditions such as air tightness load and torsional load of the vehicle body of the rail vehicle. In addition, under the same strength condition, the self-weight is small, the cross section of the vehicle body is simple, the structural sections are less, the assembly workload is small, the profiles of the vehicle body can be assembled and connected quickly, the production efficiency of the vehicle body is high and the quality is stable.

Specifically, the vehicle body 11 is substantially composed of a roof 1, a underframe 2, side roofs 3 and side walls 4 located on two sides, an upper edge of each side roof 3 is connected to an edge of the roof 1, an upper edge of each side wall 4 is connected to a lower edge of the side roof 3, and a lower edge of each side wall 4 is connected to an edge of the underframe 2.

The roof 1, the underframe 2, the side roofs 3 and the side walls 4 are respectively formed by splicing double-layer pultruded profiles with different shapes, each double-layer pultruded profile includes an outer plate, an inner plate and chambers in an interlayer between the outer plate and the inner plate and separated by rib plates; the upper edge and the lower edge of each side roof 3 are respectively connected to the edge of the roof 1 and the upper edge of the side wall 4 through lapping joints. The lower edge of each side wall 3 is connected to the edge of the underframe 2 through a side wall connector 5, which is a single double-layer pultruded profile, and an upper edge of the side wall connector 5 is connected to the lower edge of the side wall 4 through a plug joint, and a lower edge of the side wall connector 5 is connected to the edge of the underframe 2 through a push-on joint.

According to the different technical requirements such as strength, stiffness, tightness and lightweight of various parts of the vehicle body structure, the profiles of the vehicle body have a structure with a variable cross section, a distance between the outer plate and the inner plate of the double-layer pultruded profile of each side roof 3 gradually increases and then gradually decreases from the upper edge to the lower edge, a distance between the outer plate and the inner plate of the double-layer pultruded profile of each side wall 4 gradually decreases and then gradually increases from the upper edge to the lower edge, the chambers of the profiles are triangular chambers, trapezoidal chambers, rectangular chambers and various combinations of the triangular chambers, the trapezoidal chambers and the rectangular chambers.

Figure 4:
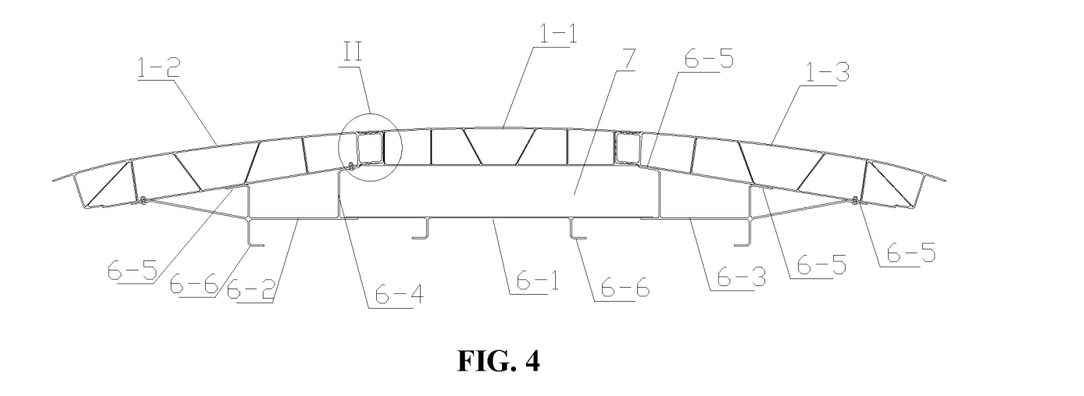
FIG. 4 is a schematic cross sectional structural view of a roof ventilation air duct formed by a roof and an air duct profile.

Referring to FIG. 4, FIG. 4 is a schematic cross sectional structural view of a roof ventilation air duct formed by a roof and an air duct profile.

As shown in the figure, the double-layer pultruded profile of the roof 1 mainly includes a first roof profile 1-1 in the middle and a second roof profile 1-2 and a third roof profile 1-3 which are symmetrical, where the first roof profile 1-1 is respectively connected to the second roof profile 1-2 and the third roof profile 1-3 through plug joints.

The three roof profiles are bonded through two plug joints with self-expanding adhesive, the inner chambers of the profiles are substantially designed into trapezoidal chambers according to requirements of strength and mounting interface in combination with the requirement of weight reduction, and the plug joints are positioned in a low stress area of the roof structure.

An air duct profile 6 is provided below the roof 1, an axial passage with an upward opening is defined inside the air duct profile 6, and the axial passage forms a roof ventilation air duct 7 with a lower surface of the double-layer pultruded profile of the roof 1.

The air duct profile 6 is formed by bonding three profiles, which are a left profile 6-2 and a right profile 6-3 of being symmetrical and a connecting plate 6-1 in the middle, respectively, the axial passage of the air duct profile 6 is divided into a main passage located at the center and sub passages located on two sides of the main passage, and a left edge and a right edge of the connecting plate 6-1 are stacked and connected to extension edges at bottoms of the left profile 6-2 and the right profile 6-3, respectively, to form a bottom of the main passage. The main passage is substantially rectangular. The sub passages include a first sub passage located outside the main passage and a second sub passage located outside the first sub passage, the first sub passage is substantially trapezoidal, and the second sub passage is substantially triangular.

The axial passage of the air duct profile 6 is formed by providing a vertical partition plate 6-4, a connecting portion in a bending shape is provided on an upper edge of the partition plate 6-4 and upper edges of two sides of the air duct profile 6, respectively, and the connecting portions 6-5 are attached to a lower surface of the roof 1 and are connected with the lower surface of the roof 1 by being bonded riveted.

A lower surface of the air duct profile 6 is symmetrically provided with two sets of bearing portions 6-6 in right-angle shape, one set of bearing portions 6-6 is bent inward, the other set of bending portions 6-6 is bent outward, and an interval between the bearing portions 6-6 bent inward is greater than that of the bending portions 6-6 bent outward.

The air duct structure and the roof form a sealed passage chamber after being bonded riveted with each other, which can meet the requirements of the vehicle ventilation and equipment pipeline passage. After the roof ventilation air duct 7 and the roof 1 are fixed, they can be used as an integral structure to be jointly involved in the loading of the vehicle body, which improves the strength, stiffness of the vehicle body, and meets the technical requirements of strength, stiffness and lightweight of the vehicle body.

Corresponding functional materials may be filled in the chambers of the structure of the roof according to the requirements of heat insulation, vibration isolation and noise reduction of the structure, so as to improve the functional index of the structure.

Figure 6:
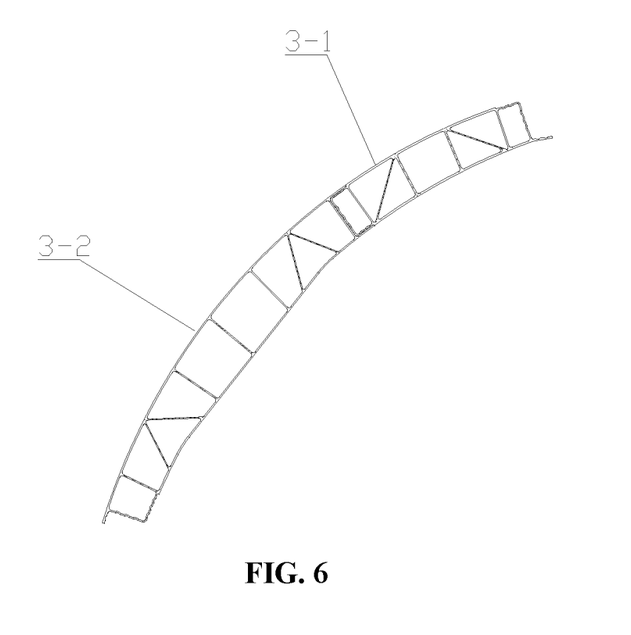
FIG. 6 is a schematic cross sectional structural view of a side roof.
Figure 7:
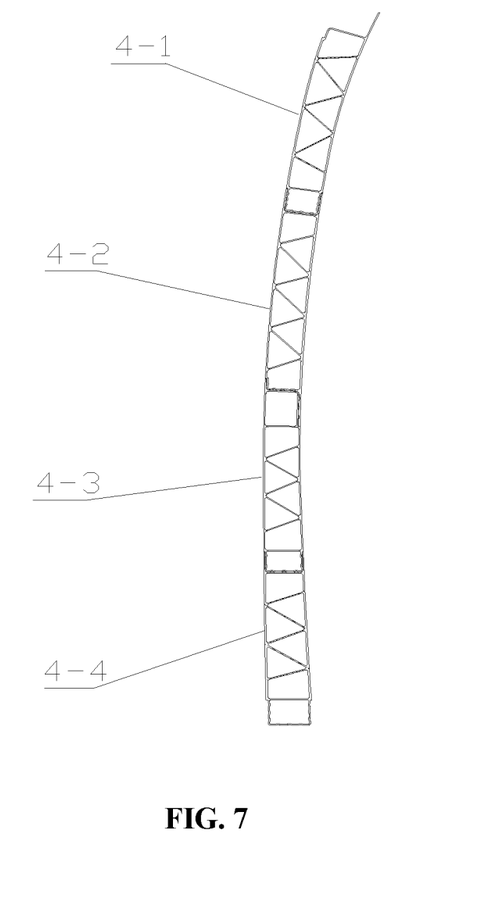
FIG. 7 is a schematic cross sectional structural view of a side wall.

Referring to FIG. 6 and FIG. 7, FIG. 6 is a schematic cross sectional structural view of the side roof; and FIG. 7 is a schematic cross sectional structural view of the side wall.

As shown in the figures, the double-layer pultruded profile of each side roof 3 includes a first side roof profile 3-1 and a second side roof profile 3-2, and the first side roof profile 3-1 and the second side roof profile 3-2 are connected through a plug joint with self-expanding adhesive, the chambers in the profiles are substantially designed into trapezoidal chambers and triangular chambers according to requirements of strength and mounting interface, and the plug joint is positioned in a low stress area of the structure.

Both sides of the side roof 3 are designed as lapping joints, a position and a structure of the upper lapping joint match with that of the lapping joint of the roof 1, which meets the assembly and mounting requirements of the roof and an air conditioner seat. A position of the lower lapping joint is the same with a position of a window opening, and a structure of which meets the requirements of mounting and sealing of a glass.

Corresponding functional materials may be filled in the chambers of the structure of the side roofs 3 according to the requirements of heat insulation, vibration isolation and noise reduction of the structure, so as to improve the functional index of the structure.

Each side roof 4 is bonded by four composite material pultruded profiles through two plug joints and one lapping joint with self-expanding adhesive, the chambers in the profiles are substantially designed into triangular chambers and trapezoidal chambers according to requirements of strength and mounting interface, and the plug joints are positioned in a low stress area of the structure.

The double-layer pultruded profile of each side wall 4 includes a first side wall profile 4-1, a second side wall profile 4-2, a third side wall profile 4-3 and a fourth side wall profile 4-4, the first side wall profile 4-1 is connected to the second side wall profile 4-2 through a plug joint, the second side wall profile 4-2 is connected to the third side wall profile 4-3 through a lapping joint, and the third side wall profile 4-3 is connected to the fourth side wall profile 4-4 through a plug joint.

An upper end of the side wall 4 is designed as a lapping joint, and the position and the structure of which are matched with the lapping joint of the side roof 3 so as to meet the assembly requirement of the side roof 3.

Similarly, corresponding functional materials may be filled in the chambers of the structure of the side walls according to the requirements of heat insulation, vibration isolation and noise reduction of the structure, so as to improve the functional index of the structure.

Figure 8:
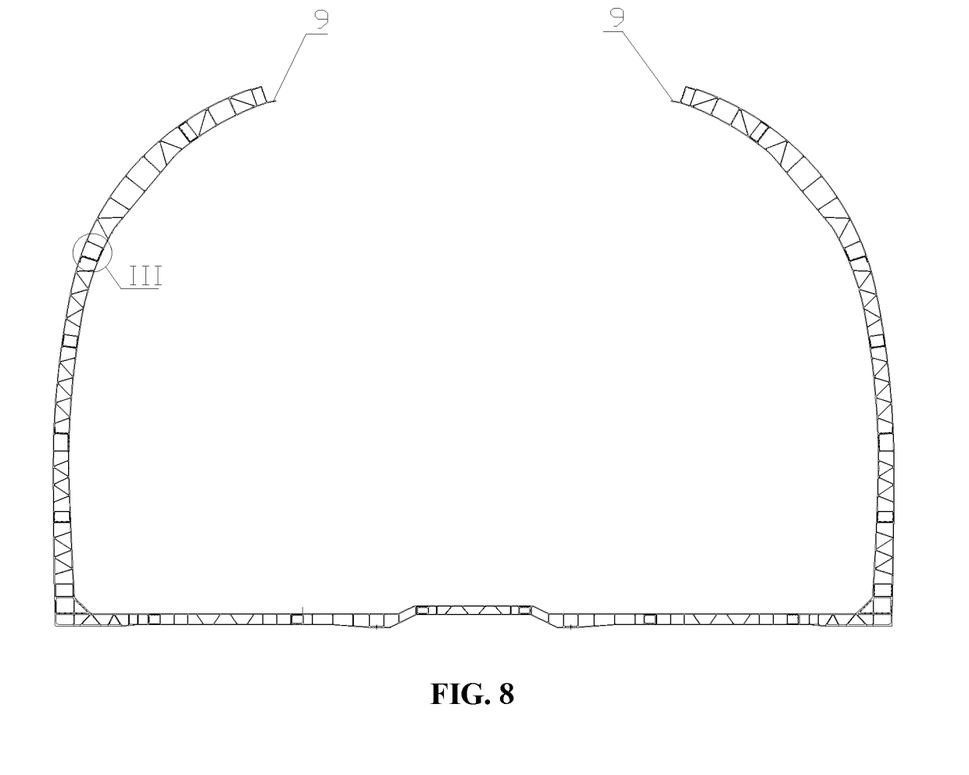
FIG. 8 is a cross sectional view of the splicing-type vehicle body shown in FIG. 1 taken along B-B.

Referring to FIG. 8, FIG. 8 is a cross sectional view of the splicing-type vehicle body shown in FIG. 1 taken along B-B.

As shown in the figure, a position of the lapping joint on the upper edge of the side roof 3 is the same with a position of a roof air conditioner seat, the lapping joint of the side roof 3 has the sane structure with a structure of a roof equipment mounting seat interface, and a position of the lapping joint on the lower edge of the side roof 3 is the same with a position of an upper edge of the window opening.

Connections between two sides of the roof 1 and the side roofs are designed as lapping joints, so as to meet the mounting requirements of assembling the roof to the vehicle body, positions of the lapping joints are the same with the positions of the roof air conditioner seat, the lapping joints have the same structure with the roof equipment mounting seat interface such as the air conditioner, so as to meet the technical requirements of layout and position adjustment of the air conditioner and the technical requirement of sealing of the vehicle body.

The structures of the plug joint, lapping joint and push-on joint are further described in detail below.

Figure 5:
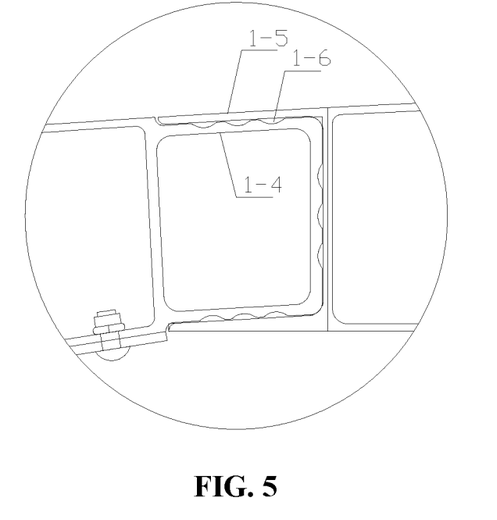
FIG. 5 is a schematic partial enlarged view of portion II shown in FIG. 4.

Referring to FIG. 5, FIG. 5 is a schematic partial enlarged view of Portion II shown in FIG. 4.

As shown in the figure, the plug joint between the first roof profile 1-1 and the second roof profile 1-2 is composed of a male plug 1-4 and a female plug 1-5, the female plug 1-5 is formed on a left edge of the first roof profile 1-1, the male plug 1-4 is formed on a right edge of the second roof profile 1-2, the female plug 1-5 has a socket outer edge and a socket inner edge extending from the outer plate and the inner plate, respectively, a step configured to be matched with the socket outer edge is formed on the outer plate of the male plug 1-4, and a step configured to be matched with the socket inner edge is formed on the inner plate of the male plug 1-4, so as to ensure a smooth transition between the inner surface and the outer surface of the two profiles after plug.

In order to further improve the reliability of the connection, multiple slots 1-6 or recesses parallel along an axial direction are formed on an end surface, the outer plate and an outer surface of the inner plate of the male plug 1-4, respectively. Instead, multiple slots 1-6 or recesses can be formed on an end surface, the outer plate and an inner surface of the inner plate of the female plug 1-5, respectively.

The plug joints of the side roofs 3, the side walls 4 and the underframe 2 are similar with the plug joint of the roof 1, which will not be illustrated one by one here.

Figure 9:
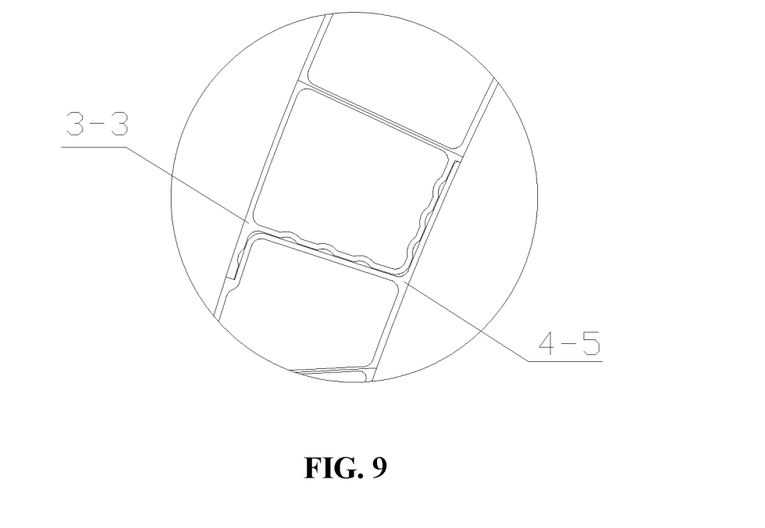
FIG. 9 is a schematic partial enlarged view of portion III shown in FIG. 8.

Referring to FIG. 9, FIG. 9 is a schematic partial enlarged view of Portion III shown in FIG. 8.

As shown in the figure, the lapping joint between the side roof 3 and the side wall 4 includes a first lapping end 3-3 formed on the lower edge of the second side roof profile 3-2 and a second lapping end 4-5 formed on the upper edge of the first side roof profile 4-1, an outer side of the first lapping end 3-3 is provided with a first lapping edge extending from the outer plate, an inner side of the second lapping end 4-5 is provided with a second lapping edge extending from the inner plate, a step configured to be matched with the first lapping edge is formed on an outer side of the second lapping end, and a step configured to be matched with the second lapping edge is formed on an inner side of the first lapping end.

In order to further improve the reliability of the connection, multiple slots 1-6 or multiple recesses parallel along the axial direction are formed on an end surface and an inner side surface of the first lapping end 3-3 and an inner surface of the first lapping edge. Instead, multiple slots 1-6 or multiple recesses can be formed on an end surface and an inner side surface of the second lapping end 4-5 and an inner surface of the second lapping edge.

The structures of the lapping joints between the side roofs 3 and the roof 1 and the lapping joints of the side walls 4 are similar to those of the above lapping joints, which will not be illustrated one by one here.

Figure 3:
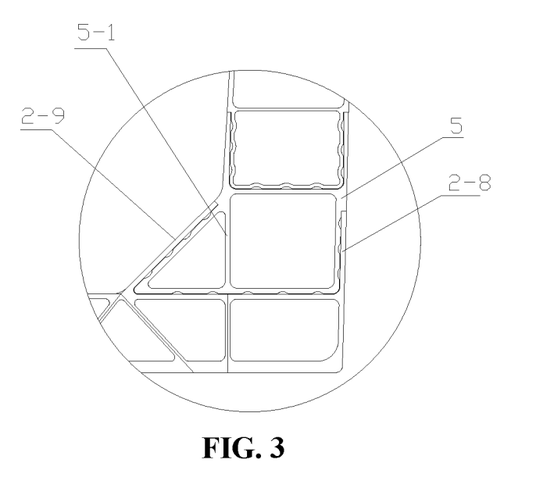
FIG. 3 is a schematic partial enlarged view of portion I shown in FIG. 2.

Referring to FIG. 3, FIG. 3 is a schematic partial enlarged view of Portion I shown in FIG. 2.

As shown in the figure, the push-on joint between the side wall 4 and the underframe 2 is mainly composed of a push-on slot formed on an upper surface of the edge of the underframe 2 and a push-on connector 5-1 formed on the lower edge of the side wall connector 5, the side wall connector 5 is also a double-layer pultruded profile made of carbon fiber composite material, a top of the side wall connector 5 is connected to the side wall 4 through the plug joint, an interior of the side wall connector 5 is in the form of the combination of triangular chambers and rectangular chambers, so as to meet the requirements of connection structure strength at the root of the side wall and the requirements of the profile pultrusion process.

The push-on slot of the underframe 2 includes a first push-on plate 2-8 and a second push-on plate 2-9, the first push-on plate 2-8 is located on an outer side, the second push-on plate 2-9 is located on an inner side, and a distance between the first push-on plate 2-8 and the second push-on plate 2-9 gradually increases from top to bottom, and a trapezoidal push-on slot is formed between the first push-on plate 2-8 and the second push-on plate 2-9; the push-on connector 5-1 of the side wall connector 5 has a trapezoidal cross section which is pushed into the push-on slot from an end.

In order to further improve the reliability of the connection, multiple slots 1-6 or multiple recesses parallel along the axial direction are formed on an inner surface of the push-on slot or an outer surface of the push-on connector 5-1.

Since the cross section of the side wall connector 5 has the trapezoidal structure, which cannot be plugged and connected with the push-on slot of the underframe 2, the whole side wall connector 5 can be pushed from the end along the axial direction with a push tool and then a bonding process is carried out during assembly.

Figure 10:
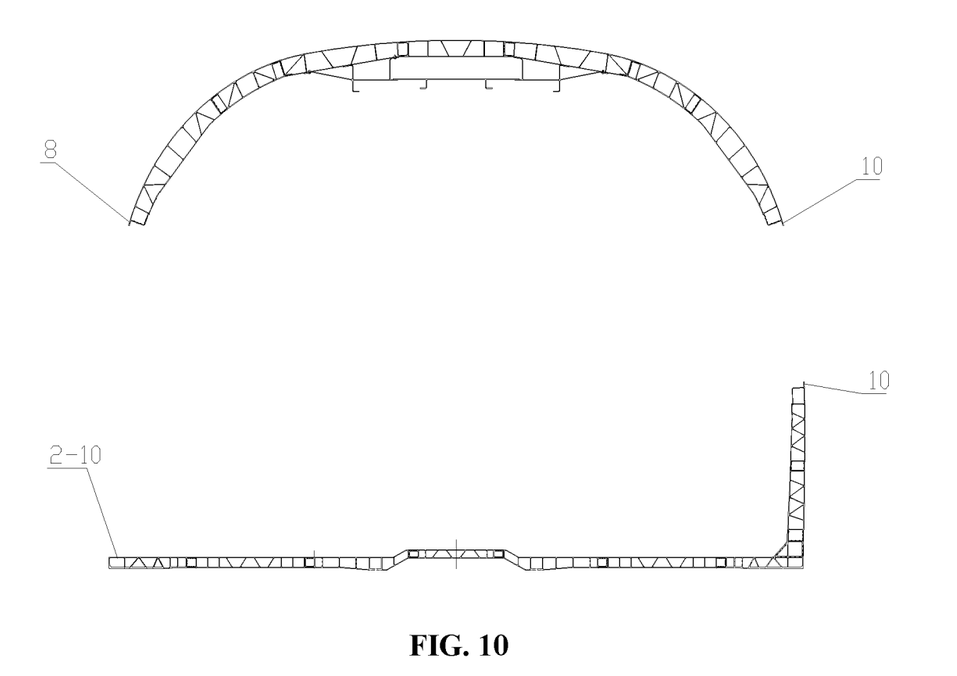
FIG. 10 is a cross sectional view of the splicing-type vehicle body shown in FIG. 1 taken along C-C.
Figure 11:
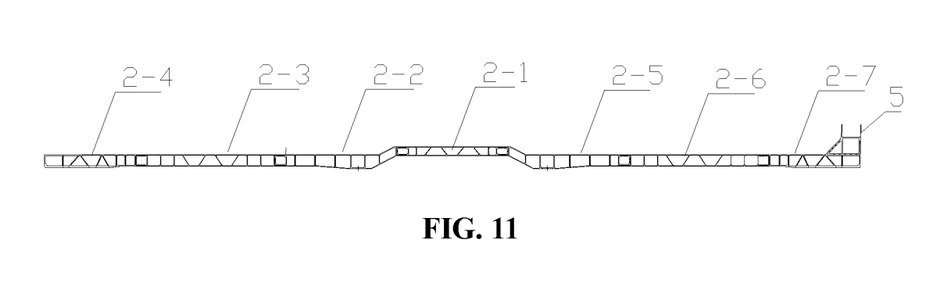
FIG. 11 is a schematic cross sectional structural view of an underframe at a vehicle door.

Referring to FIG. 10 and FIG. 11, FIG. 10 is a cross sectional view of the splicing-type vehicle body shown in FIG. 1 taken along C-C; and FIG. 11 is a schematic cross sectional structural view of the underframe at a vehicle door.

As shown in the figures, the second side roof profile 3-2 of the side roof 3 is provided with a mounting rib plate 8 on an upper edge of the vehicle door according to the requirements for assembling a vehicle door, so as to meet the requirements of mounting and sealing of the vehicle door.

The two lapping joints of the side walls 4 are at the same level with a vehicle window, and the structure of which meets the requirement of mounting a vehicle window glass. The two side wall profiles (that is, the second side wall profile 4-2 and the third wall profile 4-3) are cut at the vehicle window, and a cutting size is the same with a length of the vehicle window, which can meet technical the technical requirements of window opening, reduce the processing process of the product opening, and improve the production efficiency and quality.

The underframe 2 is bonded by seven composite material pultruded profiles through six plug joints with self-expanding adhesive, the chambers in the profiles are substantially designed into triangular chambers and trapezoidal chambers according to requirements of strength and mounting interface, and the plug joints are positioned in a low stress area of the structure.

Specifically, the double-layer pultruded profile of the underframe 2 includes a first underframe profile 2-1 in the middle, a second underframe profile 2-2, a third underframe profile 2-3, a fourth underframe profile 2-4, a fifth underframe profile 2-5, a sixth underframe profile 2-6 and a seventh underframe profile 2-7 which are systematically arranged at both sides, the second underframe profile 2-2. These seven double-layer pultruded profiles are connected through six plug joints, the fourth underframe profile 2-4 and the seventh underframe profile 2-7 are further connected to the side walls 4 through the push-on connectors 5-1 of the side wall connectors 5. If the side wall connectors 5-1 are regarded as a composite part of the underframe 2, it equals that the underframe 2 has nine composite material pultruded profiles.

A height of the first underframe profile 2-1 is greater than the second underframe profile 2-2 and the fifth underframe profile 2-5 on the two sides of the first underframe profile 2-1, and bending portions extending obliquely upward to be transitionally connected to the first underframe profile 2-1 are provided on the second underframe profile 2-2 and the fifth underframe profile 2-5, respectively. For the second underframe profile 2-2, a thickness of an inner side is greater than that of an outer side of the second underframe profile 2-2, and a structure of the fifth underframe profile 2-5 is mirror-symmetrical with that of the second underframe profile 2-2. For the fourth underframe profile 2-4, a thickness of an outer side is greater than that of an inner side of the fourth underframe profile 2-4, a structure of the seventh underframe profile 2-7 is mirror-symmetrical with that of the fourth underframe profile 2-4.

Upper portions of the fourth underframe profile 2-4 and the seventh underframe profile 2-7 are designed as lapping joints. Besides a structure of a socket can meet the mounting requirement of the push-on joints, a turning edge of the socket can be further removed by machining so as to form a platform step 2-10 at the position of the vehicle body for mounting vehicle doors in order to meet the requirements of mounting and sealing of the vehicle door mechanism.

Similarly, corresponding functional materials may be filled in the chambers of the structure of the underframe 2 according to the requirements of heat insulation, vibration isolation and noise reduction of the structure to improve the functional index of the structure, so that the functional effect of the underframe 2 is better than a sandwich structure with a single structure.

The above composite material vehicle structure mainly includes parts of the roof 1, the side roofs 3, the side walls 4 and the underframe 2, these parts can be integrally assembled into a whole vehicle structure after being separately assembled. Instead, the roof 1, the side roofs 3 and the side walls 4 can be assembled to become parts of the vehicle, and then assembled with the underframe 2 to form the whole vehicle structure. The assembly and manufacturing method of the vehicle body are flexible, and the assembly method can be flexibly selected according to the order quantity, assembly equipment, construction site and other conditions.

In at least one embodiment, the upper edge and the lower edge of each side roof 3 are connected to the edge of the roof 1 and the upper edge of the side wall, respectively, through the lapping joints in opposite lapping directions, and the connection strength can be further improved by providing the lapping joints in opposite lapping directions.

In other embodiments, in addition to the carbon fiber composite material, the double-layer pultruded profile may be a metal profile, such as an aluminum alloy profile. If the double-layer pultruded profile is the aluminum alloy profile, adjacent double-layer pultruded profile are connected by welding at the plug joints, the lapping joints and the push-on joints according to the material property, and other structures are substantially the same with the above embodiments, which can refer to the above embodiments.

The above embodiments are only preferred solutions of the present application, and the present application is not specifically limited thereto. On this basis, targeted adjustments can be made according to actual needs, thereby obtaining different embodiments. For example, the inner chambers of the roof 1, the side roofs 3, the side walls 4 and the underframe 2 are designed into other combinations of the triangular chambers, the trapezoidal chambers and the rectangular chambers, or the number of splicing profiles of the roof 1, the side roofs 3, the side walls 4 and the underframe 2 is further increased or decreased. Since there are a lot of possible implementations, no more examples are taken and illustrated here.

In the structure of the double-layer multi-chamber splicing-type vehicle body provided according to the present disclosure, which has the characteristics of high strength, high stiffness and small weight of the multi-chamber profiles, is splicing assembled by means of lapping, plugging and pushing with self-expanding adhesive or by welding, the problems of large self-weight, low strength and easy corrosion of the metal vehicle body of the existing rail vehicle can be solve. Furthermore, the problems of large number of sections, poor effects of sealing and weight reduction, and low production efficiency of the existing composite material vehicle body can be solved. In the production process, the assembly method can be flexibly adjusted according to the actual production resources of the product.

In addition to the splicing-type vehicle body, a rail vehicle is provided according to the present disclosure, which includes a vehicle body, and a vehicle window, a vehicle door and a roof air conditioner arranged in the vehicle body. The vehicle body is the splicing-type vehicle body as described above, and other structures of the rail vehicle can refer to the conventional technology, and will not be repeated herein.

The splicing-type vehicle body and the rail vehicle provided according to the present application have been described in detail above. The principle and the embodiments of the present disclosure are illustrated herein by specific examples. The above description of the examples is only intended to facilitate the understanding of the concept of the present application. It should be noted that, for the person skilled in the art, many modifications and improvements may be made to the present application without departing from the principle of the present application, and these modifications and improvements are also deemed to fall into the protection scope of the present application defined by the claims.

What is claimed is:

1. A splicing-type vehicle body, comprising a roof, a underframe, side roofs and side walls located on two sides, wherein an upper edge of each side roof is connected to an edge of the roof, an upper edge of each side wall is connected to a lower edge of the side roof, a lower edge of each side wall is connected to an edge of the underframe; the roof, the underframe, the side roofs and the side walls are respectively formed by splicing double-layer pultruded profiles, each double-layer pultruded profile comprises an outer plate, an inner plate and chambers in an interlayer between the outer plate and the inner plate and separated by rib plates, wherein the upper edge and the lower edge of each side roof are respectively connected to the edge of the roof and the upper edge of the side wall through lapping joints, the lower edge of each side wall is connected to the edge of the underframe through a side wall connector; the side wall connector is a single double-layer pultruded profile, an upper edge of the side wall connector is connected to the lower edge of the side wall through a plug joint, and a lower edge of the side wall connector is connected to the edge of the underframe through a push-on joint,     wherein each push-on joint comprises a push-on slot formed on an upper surface of the edge of the underframe and a push-on connector formed on the lower edge of the side wall connector; the push-on slot comprises a first push-on plate and a second push-on plate, the first push-on plate is located on an outer side, the second push-on plate is located on an inner side, and a distance between the first push-on plate and the second push-on plate gradually increases from top to bottom, and a trapezoidal push-on slot is formed between the first push-on plate and the second push-on plate; the push-on connector of the side wall connector has a trapezoidal cross section so as to be pushed into the push-on slot from an end.

2. The splicing-type vehicle body according to claim 1, wherein each lapping joint comprises a first lapping end and a second lapping end respectively formed on edges of two connected double-layer pultruded profiles, an outer side of the first lapping end is provided with a first lapping edge extending from the outer plate, an inner side of the second lapping end is provided with a second lapping edge extending from the inner plate, a step configured to be matched with the first lapping edge is formed on an outer side of the second lapping end, and a step configured to be matched with the second lapping edge is formed on an inner side of the first lapping end.

3. The splicing-type vehicle body according to claim 2, wherein a slot or a recess is formed on an end surface and an inner side surface of the first lapping end and an inner surface of the first lapping edge, respectively; or a slot or a recess is formed on an end surface and an inner side surface of the second lapping end and an inner surface of the second lapping edge, respectively.

4. The splicing-type vehicle body according to claim 1, wherein each plug joint comprises a male plug and a female plug respectively formed on edges of two connected double-layer pultruded profiles, the female plug has a socket outer edge and a socket inner edge respectively extending from the outer plate and the inner plate, a step configured to be matched with the socket outer edge is formed on the outer plate of the male plug, and a step configured to be matched with the socket inner edge is formed on the inner plate of the male plug.

5. The splicing-type vehicle body according to claim 4, wherein a slot or a recess is formed on an end surface, the outer plate and an outer surface of the inner plate of the male plug; or a slot or a recess is formed on an end surface, the outer plate and an inner surface of the inner plate of the female plug.

6. The splicing-type vehicle body according to claim 1, wherein a slot or a recess is formed in an inner surface of the push-on slot or an outer surface of the push-on connector.

7. The splicing-type vehicle body according to claim 1, wherein the upper edge and the lower edge of each side roofs are respectively connected to the edge of the roof and the upper edge of the side wall through the lapping joints in opposite lapping directions.

8. The splicing-type vehicle body according to claim 1, wherein a distance between the outer plate and the inner plate of the double-layer pultruded profile of each side roof in the cross section gradually increases and then decreases from the upper edge to the lower edge; the distance between the outer plate and the inner plate of the double-layer pultruded profile of each side wall in a cross section gradually decreases and then increases from the upper edge to the lower edge.

9. The splicing-type vehicle body according to claim 1, further comprising an air duct profile connected below the roof, wherein the air duct profile is configured to form a sealed roof ventilation air duct.

10. The splicing-type vehicle body according to claim 9, wherein an axial passage with an upward opening is defined inside the roof ventilation air duct, and the axial passage and a lower surface of the double-layer pultruded profile of the roof form the roof ventilation air duct.

11. The splicing-type vehicle body according to claim 10, wherein the axial passage comprises a main passage located at the center and sub passages located on two sides of the main passage.

12. The splicing-type vehicle body according to claim 11, wherein the sub passages comprise a first sub passage located outside the main passage and a second sub passage located outside the first sub passage; the main passage is substantially rectangular, the first sub passage is substantially trapezoidal, and the second sub passage is substantially triangular.

13. The splicing-type vehicle body according to claim 11, wherein the air duct profile comprises a left profile and a right profile which are symmetrical and a connecting plate in the middle, the connecting plate forms a bottom of the main passage, and a left edge and a right edge of the connecting plate are respectively stacked and connected to extension edges at bottoms of the left profile and the right profile.

14. The splicing-type vehicle body according to claim 10, wherein the axial passage of the air duct profile is formed by providing a vertical partition plate, a connecting portion in a bending shape is respectively provided on an upper edge of the partition plate and upper edges of two sides of the air duct profile, and the connecting portions abut against a lower surface of the roof and are bonded riveted with the lower surface of the roof.

15. The splicing-type vehicle body according to claim 1, wherein the double-layer pultruded profile of the roof comprises a first roof profile in the middle and a second roof profile and a third roof profile which are symmetrical, and the first roof profile is respectively connected to the second roof profile and the third roof profile through plug joints.

16. The splicing-type vehicle body according to claim 1, wherein the double-layer pultruded profile of each side roof comprises a first side roof profile and a second side roof profile, and the first side roof profile and the second side roof profile are connected through a plug joint.

17. The splicing-type vehicle body according to claim 16, wherein a position of the lapping joint on the upper edge of the side roof is the same with a position of a roof conditioner mounting seat, the lapping joint of the side roof has the same structure with a structure of a roof equipment mounting seat interface; a position of the lapping joint on the lower edge of the side roof is the same with a position of an upper edge of a window opening.

18. The splicing-type vehicle body according to claim 17, wherein the side roof is provided with a mounting rib plate for assembling a vehicle door on an upper edge of the vehicle door.

19. The splicing-type vehicle body according to claim 1, wherein the double-layer pultruded profile of each side wall comprises a first side wall profile, a second side wall profile, a third side wall profile and a fourth side wall profile, the first side wall profile is connected to the second side wall profile through a plug joint, the second side wall profile is connected to the third side wall profile through a lapping joint, and the third side wall profile is connected to the fourth side wall profile through a plug joint.

20. The splicing-type vehicle body according to claim 19, wherein the lapping joint between the second side wall profile and the third side wall profile is at the same level with a lower edge of a vehicle window, the first side wall profile and the second side wall profile are cut at the vehicle window, a cutting size of the disconnection is the same with a length of the vehicle window, to form a window opening.

21. The splicing-type vehicle body according to claim 1, wherein the double-layer pultruded profile of the underframe comprises a first underframe profile in the middle, a second underframe profile, a third underframe profile, a fourth underframe profile, a fifth underframe profile, a sixth underframe profile and a seventh underframe profile, the second underframe profile, the third underframe profile and the fourth underframe profile are symmetrical with the fifth underframe profile, the sixth underframe profile and the seventh underframe profile on two sides of the first underframe profile, and the first underframe profile, the second underframe profile, the third underframe profile, the fourth underframe profile, the fifth underframe profile, the sixth underframe profile and the seventh underframe profile are connected through six plug joints.

22. The splicing-type vehicle body according to claim 21, wherein a height of the first underframe profile is higher than the second underframe profile and the fifth underframe profile on the two sides of the first underframe profile, and a bending portion extending obliquely upward to be transitionally connected to the first underframe profile is respectively provided on the second underframe profile and the fifth underframe profile.

23. The splicing-type vehicle body according to claim 1, wherein a platform step is formed at a connection between each side wall and the underframe by removing a turning edge of the socket to mount a vehicle door mechanism.

24. The splicing-type vehicle body according to claim 1, wherein the chambers of each double-layer pultruded profile include a triangular chamber, a trapezoidal chamber, a rectangular chamber and a combination thereof.

25. The splicing-type vehicle body according to claim 1, wherein the chambers of each double-layer pultruded profile of the roof, the underframe, the side roofs or the side walls are filled with thermal insulation material, vibration insulation material or noise reduction material.

26. The splicing-type vehicle body according to claim 1, wherein each double-layer pultruded profile is made of a carbon fiber composite material, and adjacent double-layer pultruded profiles are connected at a joint through adhesive; or the double-layer pultruded profile is made of an aluminum alloy material, and adjacent double-layer pultruded profiles are connected at a joint by welding.

27. A railway vehicle, comprising a vehicle body, a vehicle window, a vehicle door and a roof air conditioner which are arranged on the vehicle body, wherein the vehicle body is the splicing-type vehicle body according to claim 1.

* * * * *